US011254064B2

(12) United States Patent
Rametsteiner et al.

(10) Patent No.: US 11,254,064 B2
(45) Date of Patent: Feb. 22, 2022

(54) THERMAL JOINING OF PLASTIC OBJECTS BY MEANS OF HEATING MEANS HAVING LOW CURIE TEMPERATURE (71) Applicant: BRUGG Rohrsystem AG, Kleindöttingen (CH)

(72) Inventors: Karl Rametsteiner, Linz (AT); Urs Hunziker, Meilen (CH)

(73) Assignee: Brugg Rohrsystem AG, Kleindöttingen (CH)

(*) Notice: Subject to any disclaimer, the term of this patent is extended or adjusted under 35 U.S.C. 154(b) by 373 days.

(21) Appl. No.: 16/343,432

(22) PCT Filed: Oct. 20, 2017

(86) PCT No.: PCT/EP2017/076898
§ 371 (c)(1),
(2) Date: Apr. 19, 2019

(87) PCT Pub. No.: WO2018/073433
PCT Pub. Date: Apr. 26, 2018

(65) Prior Publication Data
US 2019/0315069 A1 Oct. 17, 2019

(30) Foreign Application Priority Data
Oct. 20, 2016 (DE) .................. 10 2016 120 043.3

(51) Int. Cl.
B29C 65/36 (2006.01)
B29C 65/00 (2006.01)
(Continued)

(52) U.S. Cl.
CPC ........ B29C 65/3648 (2013.01); B29C 65/364 (2013.01); B29C 65/3668 (2013.01);
(Continued)

(58) Field of Classification Search
CPC .......... H05B 6/10; H05B 6/02; B29C 65/346; B29C 65/3668; B29C 65/3676
See application file for complete search history.

(56) References Cited

U.S. PATENT DOCUMENTS 2,739,829 A * 3/1956 Cundiff ............ B29C 66/52298
285/21.2
5,125,690 A * 6/1992 Taylor .................... B29C 65/18
156/308.2
(Continued)

FOREIGN PATENT DOCUMENTS

DE 102006059337 A1 6/2008
EP 0265666 B1 2/1993
(Continued)

OTHER PUBLICATIONS

Machine Translation of JP10-47580 (Year: 1998).*
(Continued)

Primary Examiner — Daniel McNally
(74) Attorney, Agent, or Firm — Robert A. Blaha; Smith Tempel Blaha LLC (57) ABSTRACT Described is a heating means for thermally connecting two objects each having a plastic material, wherein, in the connecting, a first inner object is surrounded at least partially by a second outer object, and the heating means is located between the first inner object and the second outer object. The heating means has a ribbon-type structure, in which a plurality of openings is formed. These openings are dimensioned such that molten-on plastic material of the first inner object and/or of the second outer object can intrude and can connect to molten-on plastic material of the respective other object. Alternatively or in combination, the openings are filled with a plastic material, which can connect to molten-on plastic material of the first inner object and/or of the second outer object. The ribbon-type structure has a ferro-
(Continued)

magnetic material, which is inductively heatable and which has a Curie temperature that is lower than 460° C. and/or that is adapted to the melting temperature of the first inner object and/or of the second outer object. There is further described a welded arrangement as well as a welding system having such a heating means as well as a method for thermally connecting two objects each having a plastic material.

19 Claims, 3 Drawing Sheets

(51) Int. Cl.
  *H05B 6/10* (2006.01)
  *H05B 6/02* (2006.01)
  *B29L 23/00* (2006.01)
(52) U.S. Cl.
  CPC ...... *B29C 65/3676* (2013.01); *B29C 66/1122* (2013.01); *B29C 66/52272* (2013.01); *B29C 66/53241* (2013.01); *H05B 6/02* (2013.01); *H05B 6/10* (2013.01); *B29L 2023/225* (2013.01)

(56) References Cited

U.S. PATENT DOCUMENTS

| | | | | |
|---|---|---|---|---|
| 5,462,314 | A | * | 10/1995 | Goto ................. B29C 65/3612 285/21.2 |
| 5,504,308 | A | | 4/1996 | Shiozaki |
| 5,756,973 | A | * | 5/1998 | Kirkwood ............... B29C 65/34 219/634 |
| 2004/0021249 | A1 | | 2/2004 | Weber et al. |
| 2006/0148590 | A1 | | 7/2006 | Sullivan et al. |

FOREIGN PATENT DOCUMENTS

| | | | | |
|---|---|---|---|---|
| EP | 2452805 A1 | * | 5/2012 | ........... B29C 66/232 |
| EP | 2452805 A1 | | 5/2012 | |
| EP | 2452805 B1 | | 6/2015 | |
| FR | 2748415 A1 | | 11/1997 | |
| JP | 60032632 A | * | 2/1985 | ......... B29C 66/5221 |
| JP | S63308080 A | | 12/1988 | |
| JP | H09188859 A | | 7/1997 | |
| JP | 10047580 A | * | 2/1998 | ............. B29C 66/45 |
| JP | H1047580 A | | 2/1998 | |
| KR | 100180893 B1 | | 2/1999 | |
| KR | 20110127151 A | | 11/2011 | |
| RU | 2153778 C2 | | 7/2000 | |
| RU | 2474495 | | 2/2013 | |
| SU | 1680557 A1 | | 9/1991 | |
| WO | WO 9215182 A1 | | 9/1992 | |
| WO | WO 2007128384 A2 | | 11/2007 | |
| WO | WO 2013106877 A1 | | 7/2013 | |

OTHER PUBLICATIONS

Office Action in Korean Patent Application No. 10-2019-7011365; pp. 1-10; dated Feb. 25, 2021; Korean Intellectual Property Office; Government Complex Daejeon Building 4, 189, Cheongsa-ro, Seo-gu, Daejeon, 35208, Republic of Korea.

Hering, Ekbert, u.a. Taschenbuch der Mathemati und Physik, 5 Auflage, Springer Verlag, 2009, ISBN 978-3-540-78683-2. Seite 351.

Greenwald, Selma, Changes in Lattice Constants of Cr2O3 near the Curie Temperature, In: Nature, Sep. 1, 1951, 379.

Wurm, Bernhard, Dr.; Office Action in Application 10 2016 120 043.3; pp. 1-5; dated Feb. 10, 2020; German Patent and Trademark Office, 80297, Munich, Germany.

Fomin, O.V.; Office Action in Application 2019109131; pp. 1-6; dated Jan. 31, 2020; Federal Institute for Industrial Property, Moscow, G-59, GSP-3, 125993. (English translation).

* cited by examiner

THERMAL JOINING OF PLASTIC OBJECTS BY MEANS OF HEATING MEANS HAVING LOW CURIE TEMPERATURE

CROSS-REFERENCE TO RELATED APPLICATIONS

The present application is a national phase application derived from international patent application no. PCT/EP2017/076898, filed on Oct. 20, 2017, which benefits form the filing date of German patent application no. DE 10 2016 120 043.3, filed Oct. 20, 2016, both applications of which are incorporated herein by reference in their respective entirety.

TECHNICAL FIELD

The present invention relates to the technical area of the thermally connecting two objects made of plastic by induction welding. The present invention relates in particular to a heating means made of a ferromagnetic material, a welded arrangement as well as a welding system having such a heating means as well as a method for thermally connecting two objects each having a plastic material.

TECHNOLOGICAL BACKGROUND

Objects made of plastic may be thermally connected to each other by inserting an electrically conductive material between the two objects to be connected and by heating the former by an alternating electromagnetic field, which is generated by a specially embodied generator. In the so-called induction welding of plastic objects, an electromagnetic coupling is effected between a magnetic and electrically conductive material and an induction generator substantially via a magnetic field, which is variable in time and which is generated by a coil of the induction generator.

The principle of induction welding is used in particular in the thermal connecting of ends of two plastic pipes by a plastic bushing (or sleeve), which is pushed (or slipped) over the two ends to be welded together. Herein, a magnetic and electrically conductive heating means is introduced between the plastic bushing and the lateral surface of each respective end section of the two pipes to be connected and is heated inductively such that the outer sides of the two end sections as well as the inner side of the plastic bushing are molten on and assume a permanent welding connection during a subsequent cooling down.

Induction welding methods are disclosed for example in EP 2 452 805 A1.

However, a technical problem in induction welding consists in that the amount of heat and/or the thermal energy, which is supplied via the heating means, is to be adjusted such that a stable thermal welded connection is ensured on the one hand and the form stability of the objects to be welded together is not endangered on the other hand. Only in this way, "good" welded connections can be achieved by induction welding.

SUMMARY

There may be a need to improve the induction welding in view of "good" welded connections.

This object is solved by the subjects of the independent patent claims. Advantageous embodiments of the present invention are described in the dependent claims.

According to an exemplary embodiment of the present invention, there is described a heating means for thermally connecting two objects each having a plastic material, wherein, in the connecting, a first inner object is surrounded at least partially by a second outer object, and the heating means is located between the first inner object and the second outer object. The described heating means has a ribbon-type structure, in which a plurality of openings is formed. The openings are dimensioned such that molten-on plastic material of the first inner object and/or of the second outer object can intrude (or enter) and can connect to molten-on plastic material of the respective other object. Alternatively or in combination, the openings are filled with a plastic material, which can connect to molten-on plastic material of the first inner object and/or of the second outer object. The ribbon-type structure has a ferromagnetic material, which is inductively, heatable, and has a Curie temperature that is less than 460° C.

The described heating means is based on the finding (or insight) that by the use of a ferromagnetic material having a Curie temperature that may be suitable in relation to the material of the two objects to be connected, an automatic temperature limitation may be given for a thermal connection process. This may mean that at a Curie temperature, which may be on the one hand sufficiently high in order to melt the plastic material of at least one of the two objects, and which may be on the other side not so high that the plastic material may be brought to a temperature that may result in a thermal destruction (or deterioration) of at least one of the two objects. Such a thermal destruction may be given for example in that the respective object melts on to an extent that its form (or shape) may change not insignificantly during the thermal connection process. In particular, the ferromagnetic material should have a Curie temperature, which, within a typical time period that may be required for a thermal connection process, may result only in a melting-on of a surface layer of at least one of the two objects, insofar as this Curie temperature is actually reached in a thermal connection process.

Overview of Embodiments

The expression "material" may in this document be understood both as a "uniform" material having a uniform "Curie temperature" and as a material component or plural material components of a composition of different materials. In particular, the expression "material" may relate at least to a single substance (e.g. at least an alloy component) or to a material composition (e.g. alloy).

Preferably, the heating means may be formed such that it may result in a warming of the adjoining plastic material at both sides of the ribbon-type structure. This may mean that during a thermal connecting, not only one object may be welded to another object, but that both objects may be welded to each other at least approximately symmetrically. Thus, in the heated state, both plastic materials may flow through the openings that are formed in the ribbon-type structure or may connect to the plastic material that may be already present in the openings, such that a plurality of small welded connections may form through the openings in the ribbon-type structure. This may result, after a cooling down, in a particularly high stability of the resulting thermal connection.

It is pointed out that the heating described in the present document may be effected in part by magnetic losses and in part by electrical losses. "Magnetic losses" are understood in this connection to be so-called cyclic magnetization losses (or losses due to reversal of magnetism) in the heating means, which are related to the ferromagnetic magnetizability of the heating means, and which may also be referred to as hysteresis losses. The "electrical losses" may be in particular ohmic losses in connection with the so-called eddy currents, which may be generated during the inductive interaction of the heating means with an electromagnetic field that may be generated by a corresponding generator.

Upon reaching the Curie temperature of the heating means and/or of the auxiliary heating material, the cyclic magnetization losses may cease to exist, and the coupling-in of energy into the heating means may be reduced accordingly, because only the possibly occurring electrical losses may contribute to a (further) heating of the heating means. As a function of the concrete embodiment of the heating means, this ceasing to exist of the energy input caused by the cyclic magnetization losses may already suffice for a temperature limitation. As the case may be, an according reduction of the coupling-in of energy may also be recognized by an induction generator, from which then "less power is taken out". In this connection, the induction generator may be considered as the primary side of a whole heating system, which may consist of the induction generator and the (secondary sided) heating means. A recognition of a reduced withdrawal of power may be used as a signal for controlling the induction generator such that the inductive energy transfer may be reduced further or even switched off.

According to an embodiment example of the invention, the ferromagnetic material may have a Curie temperature, which may be lower than 400° C., in particular lower than 300° C., and further in particular lower than 250° C. This may have the advantage, that a high form stability of the two objects to be welded together may be ensured also for plastic objects, which may have a comparably low melting point, even for a longer inductive welding process and/or for a welding process having a high inductive primary energy (generated by a generator).

A Curie temperature significantly above the melting point of the participating plastic materials may contribute to a faster heating during the welding process, and thus may help to a shortening of the working time for the welding process. In the case of a relatively high Curie temperature, the heating means may have to be optimized in respect of heat dissipation, heat capacity and heating rate to that effect that the energy, which may be quickly accumulated in the heating means, may be dissipated to the plastic material in such a way that the latter may not be damaged. As will be described subsequently in detail, the transition region of the loss of the ferromagnetic properties, which may make an appearance macroscopically, may be spread and/or shifted by the use of materials having different Curie temperatures, and thus, the function of the temperature limitation may additionally be configured.

According to a further embodiment example of the invention, the ribbon-type structure may have plural ferromagnetic materials, which may have different Curie temperatures. This may have the advantage that by a suitable mixture of the proportion (mass or volume ratios) of the different ferromagnetic materials an average Curie temperature may be adjusted, which may be optimum for the respective application. The described different ferromagnetic materials may also result in that at least two different Curie temperatures may be associated to the heating means. This may mean in practice that at the beginning of a connection process, when the temperature of the heating means and the surrounding plastic material may still be relatively low, both materials may contribute to an inductive heating with a comparably high heating power. When the temperature later reaches a value, which may be above the Curie temperature of the respective material, which may have the lower Curie temperature, then the heating process may take place only with a comparably lower heating power. This may enable in an advantageous manner a particularly precise control of the thermal connecting of the two objects.

It is pointed out that such a step-wise control of the heating power may be realized in principle with an arbitrary number of ferromagnetic materials with respective different Curie temperatures. In practice however, it may be sufficient for many applications, when the ribbon-type structure has only two ferromagnetic materials with different Curie temperatures.

According to a further embodiment example of the invention, the ribbon-type structure may have a structure in layers (or layer-wise composition) of different materials, which may have in particular a different hardness, a different elasticity and/or a different ductility.

By a suitable adaptation of the proportions (or amount ratios) of the different materials, it may thus be possible to modify the mechanical stretching properties of the heating means such that upon a stretching selective deformations result, which may contribute to an improvement, that is to an increased mechanical stability (or rigidity), of the produced welding connection. The deformations may in particular be height differences and/or rounding-offs (or chamferings, or honings) at the transition between the surface of the ribbon-type material to the openings.

According to present insights, in particular a combination of two or more layers of the following metallic alloys may be suitable for the described layer-wise structure: Cu—Al, Fe—Cu, Fe-stainless steel, Cu—Sn, Fe—Al, Al—Mg. In order to achieve optimum mechanical stretching properties for the respective application, it may also be possible to adapt, within an alloy, the proportions between the metals participating in the alloy.

In order to investigate the influence of different elasticities on the quality and in particular on the stability of a welded connection, a series of experiments has been carried out by the inventors. Herein, it has turned out that by a selective (or targeted) adjustment of the longitudinal elasticity of the ribbon-type structure, a significant improvement of the welding result may be achieved. Herein, the longitudinal elasticity is the elasticity of the ribbon-type structure along its elongated extension, which may act along the surface of at least the first inner object. In a welding together of pipes, this longitudinal extension (or elasticity) is the tangential direction along the cylindrical lateral surface of the respective pipe.

In these experiments, it has turned out in particular that for a too low longitudinal elasticity, i.e. if the heating means is too stiff and/or too rigid, the heating means cannot build up the necessary contact pressure over the whole connection area, which contact pressure may be required for a systematic and preferably anisotropic liquefaction of the respective plastic material. Likewise, also for too great a longitudinal elasticity, the desired contact pressure may be present at no location. It has turned out that longitudinal elasticities of 30 N to 300 N for a relative stretching of 0.1%, and in particular of 60 N to 200 N for a relative stretching of 0.1%, result in particularly good welding results. It is pointed out that herein, the longitudinal elasticity may correspond to the spring constant of the ribbon-type structure (compare Hook's law).

For the reason of completeness, it is pointed out that the structure in layers may also have plural layers of materials having different Curie temperatures. This may have the advantage that for adjusting at least one suitable Curie temperature for the specific application case, no alloy of different materials having different Curie temperatures may have to be manufactured.

According to a further embodiment example of the invention, the ribbon-type structure may be configured to form a closed ribbon-type structure, which may be continuously electrically conductive.

Stated demonstratively, the heating means may correspond to a short-circuit winding of a transformer, which winding may, as a secondary winding, assume a particularly effective electromagnetic coupling, in particular a particular effective inductive coupling, to an exciting primary coil of the transformer. Herein and in a known manner, the primary coil, which may have one or preferably plural windings, may be a fundamental component of a device, by which the two objects may be thermally connected to each other, and in particular may be welded to each other.

In the application (or use) of the described heating means for a thermal connecting of the two objects, the ribbon-type structure may simply be wrapped around the inner object, such that the two ends of the ribbon-type structure overlap and thus may form a closed ribbon, which may represent a secondary coil having a single winding.

For some applications, for example a welding together of two plastic pipes by a bushing surrounding the two ends of the plastic pipes (herein, the two plastic pipes may represent the inner object and the bushing may represent the outer object), the ribbon-type structure may be a closed structure also from the beginning, which [closed structure] may simply be introduced between the plastic pipes and the bushing by a simple slipping over (or sheathing) of an end of at least one plastic pipe.

According to a further embodiment example of the invention, the heating means may further have an adhesive force changing layer, which may be attached to, or formed at, at least one surface of the ribbon-type structure.

The adhesive force changing layer may contribute in an advantageous manner to that the flow behaviour of molten-on plastic material, which may come in contact with the heating means, may be adjusted in view of a particularly stable welded connection after the cooling down. Namely, if the surface of the two plastic objects liquefies in the course of the thermal connecting and/or the welding together, then states of captured air bubbles (or gas pockets) may develop, if all pneumatic connections "to the outside world" have already closed around the respective heating position. The pressure increase that may occur herein may act helpfully for supporting the desired preferential flow direction of the liquid plastic through the heating means. Herein, it may be of significance that the wetting of the surface of the heating means may be accompanied by optimum adhesive effects, so that the pathway of the lowest resistance of the liquid plastic material may be the pathway through the openings of the heating means, and that air pockets may not stay in the interior of the openings. Thereby, it may be prevented that the molten-on plastic material can permeate (or percolate) the heating means (through the openings).

According to a further embodiment example of the invention, the adhesive force changing layer may have an adhesive force strengthening layer at the surface of the ribbon-type structure and/or the adhesive force changing layer may have an adhesive force reducing layer at the sidewalls of the openings.

By an adhesive force strengthening between the surfaces of the ribbon-type structure and the respective plastic object, also a solid connection between the surface of the ribbon-type structure and the respective plastic object may be produced in addition to the welded connection between the two plastic objects. For this purpose, preferably both (plane) surfaces of the ribbon-type structure may be provided with an adhesive force strengthening layer.

By an adhesive force reducing layer in the region of the openings, the flow behaviour of liquefied plastic material through the ribbon-type structure may be improved. Thereby, a mechanically particularly stable direct connection between the two plastic objects may result after the cooling down.

In some embodiments, the adhesive force changing layer may be an oxide layer. Alternatively or in combination, the adhesive force changing layer may have carbonates.

As has been found by the inventors of the described heating means, an oxide layer, and in particular a metal oxide layer, may also be a (selectively formed) oxide layer at the surface of the ribbon-type structure. Such oxide layers may be formed, for example, by a selective storing of the ribbon-type structure in an atmosphere, which may contain at least 10% of an oxygen modification, thus nascent (atomic) oxygen (O), molecular oxygen ($O_2$) and/or ozone ($O_3$), and in which the rest of the atmosphere may be formed of an inert gas. The inert gas may be a noble gas, preferably He, Ar, Ne, and/or nitrogen.

The metal oxide layer may contain at least one of the following elements: Fe, Cr, Ni, if the need may be also Cu, Al, Zn, Sn as well as rare earth metals. Furthermore, the metal oxides may contain specifically at the surface portions of at least one of the following elements: Au, Ag, Cu, Rh.

In this relation, surface layers, which may contain carbonates in addition to the metal oxides, have turned out to be particularly effective. This may be achieved by an addition of small amounts of $CO_2$, wherein the small amount of $CO_2$ amounts to less than 10 weight percent (wt. %) and preferably less than 1 wt. %, in order to shift the formation of the desired metal oxides not too much in favour of carbonates.

A particularly suitable layer composition may be formed for example at temperatures of 5° C. to 120° C., preferably from 15° C. to 80° C., over a time period of at least 48 hours, preferably at least 96 hours. In order to significantly reduce the reaction duration of the mixture of oxygen, carbon dioxide and/or inert gas, the surface of the ribbon-type structure may also be impacted by an atomic plasma, which contains beside a protective gas (preferably argon) also the reactive gas components $O_2$ and $CO_2$. In this way, the desired adhesive force changing layer may be built up within a few seconds or even fractions of seconds. Furthermore, also other elements, such as for example Si, B, Ti and/or Zr, may be integrated in the surface of the ribbon-type structure by the addition of according precursor gases. In this relation, it has turned out that in particular Si and Ti may contribute to the production of a particularly suitable adhesive force changing layer. By a suitable selection of the composition of the adhesive force changing layer, the desired (adhesive) properties thereof may be adjusted.

In some embodiments, the oxide layers may have a layer thickness of less than 10 μm, in particular less than 500 nm, preferably less than 50 nm, or ideally less than 10 nm.

It is pointed out that for a structure in layers of oxides having the mentioned properties in particular very thin layers may be advantageous in the sense of an adhesion control, because the negative influence of the brittleness of oxides is minimized thereby, and the adhesion-controlling properties may nevertheless be already developed to the full extent. Very good results have been obtained in experimental investigations already with layer thicknesses of less than 10 nm (typically 1 nm to 5 nm).

According to a further embodiment example of the invention, the openings may have an average distance s from each other, which may satisfy at least one of the following relations with respect to a thickness d of the ribbon-type structure: $0.5 < s/d < 2$; $0.7 < s/d < 1.5$; $0.8 < s/d < 1.3$; $0.9 < s/d < 1.1$.

As it has turned out in experimental investigations, the described geometries of openings and/or holes may result in a qualitatively particularly tight welded connection. Herein, the openings may be arranged either (a) regularly (with a fixed offset between openings neighbouring in different directions), or (b) irregularly.

Stated demonstratively, beside the chemical surface constitution of the ribbon-type structure, also its geometry may be relevant for the quality of a welding. The final tightness of a welded connection may thus be particularly high for a suitable geometry of holes and/or openings, because no anisotropic stability values in relation to shearing forces may show up after the hardening of the liquefied plastic material. Also a chipping of parts of a plastic object may be prevented by the choice of a suitable hole geometry, wherein a chipping may comprise in particular a spatial separating of a region with temporary liquefied plastic from a region with always solid plastic.

In certain embodiments, in absolute numbers, the average distance s may be in the range between 0.1 mm and 5 mm. The same may hold for the thickness d, which may also be in the range between 0.1 mm and 5 mm.

According to a further embodiment example of the invention, a transition between the plane (or two-dimensional) surface of the ribbon-type structure and an opening may be rounded off (or chamfered). Thereby, in an advantageous manner, "sharp path changes" and/or abrupt directional changes of the liquid plastic on its way into the respective opening may be avoided. This may result in a significant improvement of the flow behaviour.

The term "rounding-off" (or chamfering) can be understood in this relation in particular such that the transition from the plane surface of the ribbon-type structure to the respective opening is free from corners and edges. The rounding-off thus may not necessarily have a radius of an imagined circle.

In the case of cylindrical openings, the transition may be, in a top view on the ribbon-type structure, a circle and/or an annulus. Herein, the width of the annulus may depend on the degree of the rounding-off. A particularly simple rounding-off may be realized by a countersinking, which may be for example performed by a countersunk head drill bit. Herein, the area of the rounding-off may get the shape of a truncated cone.

In some embodiments, the rounding-off may have a radius of more than 10 μm, in particular more than 70 μm, and further in particular more than 300 μm.

According to a further embodiment example of the invention, at least some of the openings each may have a longitudinal axis, which may form an angle that may be different from zero with a surface normal of the surface of the ribbon-type structure.

Stated demonstratively, at least some of the openings formed in the ribbon-type structure may be inclined openings. This may result in that in a flow direction, the directional change of the liquid plastic on its way into the opening may be comparably small (in particular smaller than 90°). Even if the directional change of the liquid plastic on its way into the opening is greater (in particular greater than 90°) in the opposite flow direction, such an anisotropy may result in an overall improved flow behaviour. The longitudinal axes of different openings may also be different, wherein in regions with flow directions that may be expected to be different the longitudinal axes of the respective openings may be preferably inclined respectively against the flow direction.

It has turned out furthermore that for inclined openings the mechanical stability of the plastic objects, which are welded to each other, may be increased. In particular, for different directions and/or orientations of the openings, a tensioning with the ribbon-type structure may occur upon the cooling down and the solidifying related therewith. This may increase the total stability of the welded connection according to the principle of "prestressed concrete".

According to a further embodiment example of the invention, the heating means may further have at least one further ribbon-type structure, which may be arranged beside the ribbon-type structure. The further ribbon-type structure may be oriented at least approximately parallel to the ribbon-type structure.

The distance between two mutually neighbouring sheets or (tracks) may amount to, for example, between 0.5 mm and 50 mm, in particular between 0.8 mm and 10 mm, and further in particular between 1 mm and 1.5 mm.

Stated demonstratively, the heating means may be formed with at least two sheets of ribbon-type structures. This may have the advantage, that heating means with arbitrary widths may be manufactured from only one type of ribbon-type structure. Herein, the heating means may be multi-pieced, i.e. the ribbon-type structure and the at least one further ribbon-type structure may not be connected to each other and may be, prior to a welding process, inserted separately between the two objects to be welded together.

The different ribbon-type structures may however also be connected to each other (at their longitudinal sides). Herein, the connection may be realized directly, for example with a particular overlap. Alternatively, the ribbon-type structures may also be connected via a non-conducting and/or non-ferromagnetic material, which, in accordance with the previously described separate configuration, may result in that the heating means may be formed as at least two separate secondary coils in relation to an inductive welding process.

According to a further embodiment example of the invention, the ribbon-type structure may have a surface having elevations and recesses, wherein an average height different between the elevations and recesses may be in the range between 0.01 mm and 2 mm, in particular in the range between 0.1 mm and 1.5 mm, and further in particular in the range between 0.5 mm and 1.2 mm.

The surface roughness may be based on thickness differences of the ribbon-type structure and/or on a plurality of local deformations and/or deflections.

The roughness described herein may be of advantage in particular in cases, when the second outer object, for example a bushing, consists of a plastic material having thermal shrinking properties. Thereby, during the welding process, a two-sided contact pressure may be exerted on the heating means. By the rough formation of the surface of the ribbon-type structure, it may be achieved that the transition to the plastic material may be subjected to a higher contact pressure at the points of the greatest elevation than in other regions. Due to the higher pressure, a better heat coupling may be achieved, which in turn may result in an earlier melting-on in the corresponding region. This pre-melt may now be preferably pressed into the opening during the slow softening of the whole plastic part, which may result in a particularly strong connection between the plastic parts.

According to a further exemplary embodiment of the present invention, there is described an arrangement, which has (a) a first inner object, which has a first plastic material having a first melting temperature; (b) a second outer object, which surrounds the first inner object at least partially, and which has a second plastic material having a second melting temperature; (c) a heating means, which is located between the first inner object and the second outer object, wherein the heating means has a ribbon-type structure. The ribbon-type structure has a ferromagnetic material, which is inductively heatable and which has a predetermined Curie temperature, which is higher than the first melting temperature and/or the second melting temperature. In the ribbon-type structure, a plurality of openings is formed, in which a solidified (or hardened) plastic material is located, which connects the first inner object to the second outer object. Furthermore, a first temperature difference between the predetermined Curie temperature and the first melting temperature and/or a second temperature difference between the predetermined Curie temperature and the second melting temperature is in the range between 5 K and 100 K.

Also, the described arrangement is based on the finding that by a targeted selection (or selective choice) of the involved materials, namely the first plastic material, the second plastic material, and the ferromagnetic material, a particularly good welded connection may be produced between the two plastic objects in a reliable manner. This good welded connection, which may result from a welding process, in which an automatic temperature limitation may have taken place, may distinguish itself in particular in that the form (or shape) of the two plastic objects may have remained maintained due to only a superficial liquefaction of the plastic material, and nevertheless a mechanically rigid welded connection may have been produced. In the welding together of the two plastic objects, at least approximately exactly the very amount of first and/or second plastic material may have been molten on, which may result in a mechanically rigid connection on the one hand and which may not impair the form stability of the two objects on the other hand, because only a near-surface layer of plastic material may have been molten on.

The solidified plastic material located in the openings may be the first plastic material of the first inner object and/or the second plastic material of the second outer object. Alternatively or in combination, also a plastic material may be concerned, which may have been present in the openings already prior to the welding process.

The heating means may in particular be a heating means, which may have the properties of at least one of the heating means described above on the basis of plural embodiment examples.

According to a further embodiment example of the invention, the first temperature difference and/or the second temperature difference may lie in the range between 10 K and 80 K, in particular in the range between 20 K and 60 K, and further in particular in the range between 30 K and 50 K. This may have the advantage that the quality of the welded connection may be particularly high.

According to a further embodiment example of the invention, the two plastic materials may be equal. This may have the advantage that in view of a good welded connection only a matching (or adjustment) between two temperatures, the Curie temperature and the (uniform) melting temperature, may have to be effected. In addition, same plastic materials connect particularly well, such that the stability (or rigidity) of the welded connection may be particularly high.

According to a further embodiment example of the invention, the arrangement further may have a third inner object, which may have a third plastic material having a third melting temperature, wherein the second outer object may also surround at least partially the third inner object, and wherein the heating means may be located also between the third inner object and the second outer object. This may have the advantage, that by the described arrangement, more than two plastic objects may be connected to each other, so that a particular broad technical field of applications may result for the described arrangement.

Preferably, the third plastic material may be the same plastic material as the first plastic material and/or the second plastic material. Hereby, the same advantages may result, which are described above for two equal plastic materials.

In a particular embodiment, the third plastic material may be a composition (of plural plastic materials), or may have an additive compound (or dope), which may effect a reactive transformation (or reactive change) in the course of the heating up and/or of the melting.

Such reactions may be for example:
(A) cross-linking by polymer addition (thus, epoxide group with amine, amide, acid, acid anhydride, alcohol, phenol, thiol or isocyanate (also blocked with amine, amide, alcohol, phenol, thiol);
(B) cross-linking by hydrogen elimination by peroxides and/or azoic compounds;
(C) connection (or linkage) of polymer chains by vinyl polymerization, silane-vinyl addition, thio-click addition, azide-click addition.

Stated demonstratively, also reactive hot-melt adhesives may be involved in the thermal connection process. In particular, as the case may be, also the polymer surfaces to be connected together of the first inner (polymer) object and the second outer (polymer) object may intervene in the above-mentioned reactions.

According to a further embodiment example of the invention, (a) the first inner object may be a plastic pipe, (b) the third inner object may be a further plastic pipe, and (c) the second outer object may be a plastic bushing, which may surround two mutually facing ends, one end of the plastic pipe and a further end of the further plastic pipe. By the described arrangement, a pipe conduit, which may be composed of plural plastic pipes, may be formed in an advantageous manner.

In order to ensure a low-resistant flow-through of a fluid at the position of the connection of the two plastic pipes, the two frontal ends of the two involved plastic pipes may have a distance to each other that is as small as possible.

The plastic pipes may be long-distance heat pipelines (or district heating pipelines), which may be thermally insulated, as the case may be, to the outer side and/or to the inner side. Optionally, the long-distance heat pipelines may, in a known manner, include an inner pipe and/or a core pipe of metal (e.g. steel), wherein assembled core pipes may be welded to each other.

According to a further exemplary embodiment of the present invention, there is described a system, which has (a) an arrangement of the type described above, and (b) a generator for generating an electromagnetic field, which couples a coil device of the generator inductively to the heating means.

The described system is based on the finding that for the use of suitable materials for the arrangement in a welding process, an overheating of the arrangement may be prevented in an effective manner, because an inductive energy transfer from the generator to the heating means may stop automatically upon reaching the Curie temperature. This may have the advantage that an overheating of the plastic objects may be prevented even in a case where the generator may have no or only an imprecise control of the inductive energy transfer.

Special advantages may result, if the generator concerns a mobile generator, such that the distance between the primary coil and the heating means may not be precisely predetermined, such that in practice only a very imprecise knowledge on the power that is transferred inductively may be available. By a suitable selection of the Curie temperature, as has been explained in detail already above, an optimum self-limitation of the inductive energy input may occur automatically.

According to a further exemplary embodiment of the present invention, there is described a method for thermally connecting two objects each having a plastic material. The method has: (a) a laying alongside (or mounting) of a heating means to a first inner object or to a second outer object, wherein the heating means has a ribbon-type structure having a plurality of openings and a ferromagnetic material; (b) an arranging of the second outer object relative to the first inner object, such that the first inner object is surrounded at least partially by the second outer object and [such that] the heating means is located between the first inner object and the second outer object; (c) an inductively heating of the heating means, such that plastic material of the first inner object and/or plastic material of the second outer object melts on; (d) an intruding of molten-on plastic material of the first inner object and/or of molten plastic material of the second outer object into the openings, such that the two plastic materials come in contact with each other, and/or a melting-on of plastic material, which is already located in the openings; (e) a reducing of a power that is inductively transferred to the heating means as a consequence of an approaching (or approximation of) the temperature of the ferromagnetic material to a Curie temperature of the ferromagnetic material; and (f) a cooling down of the molten-on plastic material of the first inner object and/or of the molten-on plastic material of the second outer object [and/or of the plastic material located in the openings], such that the two objects are mechanically connected to each other.

Also the described method is based on the finding that an inductive energy transfer from a generator having an inductive primary coil to the heating means may be reduced automatically and stopped ultimately, in particular with the help of an intelligent control of the primary coil, if the temperature of the ferromagnetic material approaches the Curie temperature and, as the case may be, even reaches the latter. By a suitable selection of the involved materials, it may be achieved that an at least approximately optimum energy amount may always be transferred inductively to the heating means.

According to an embodiment example of the invention, the heating means may be laid alongside to the first inner object or to the second outer object such that the two ends of the ribbon-type structure may overlap.

Stated demonstratively, a closed loop may be formed, which, in respect of the inductive coupling, may represent a short-circuited secondary coil having one winding. The inductive energy transfer may be based at least partially on the macroscopic electrical conductivity. A closed winding may allow for a particular effective inductive coupling-in of energy.

According to a further embodiment example of the invention, the heating means may be laid alongside to the first inner object or to the second outer object such that the two ends of the ribbon-type structure may be separated from each other.

Stated demonstratively, an open loop may be formed. Herein, the inductive energy transfer may be effected substantially by cyclic magnetization losses (or losses due to reversal of magnetism) and the generation of eddy currents, wherein eddy currents may require a microscopic conductivity of the ribbon-type structure.

By a concentration on a warming-up and/or heating-up based exclusively on cyclic magnetization losses (by omission of a macroscopic secondary winding), the excitation frequency of the primary coil of an induction generator may be increased. This may result in a better energy efficiency during the welding process and in addition also may allow for versatile (or manifold) geometries for the primary coil. In particular, in the welding process, the primary coil may no longer have to be closed around the first inner object, because no short-circuit on the secondary side may be given. Also because of this, the variety for possible geometries of primary coils may increase. In particular, geometries of primary coils may be used, which may include only plug connections that may be little prone to contamination and/or wear.

It is pointed out that embodiment examples of the invention have been described in respect of different invention subjects. In particular, some embodiments of the invention have been described by device claims and other embodiments of the invention by method claims. However, it will become clear for the skilled person immediately upon reading this application, that, unless it is not explicitly stated differently, in addition to a combination of features, which belong to one type of invention subject, also an arbitrary combination of features, which belong to different types of invention subjects, is possible.

Further advantages and features of the present invention result from the following exemplary description of presently preferred embodiments. The individual figures of the drawings of this document are to be considered as merely schematic and not as drawn to scale.

DETAILED DESCRIPTION OF ILLUSTRATED EMBODIMENTS

It is pointed out that in the following detailed description, features and/or components of different embodiments, which are equal or at least functionally equal to the corresponding features and/or components of another embodiment, are provided with the same reference numerals or with reference numerals, which are identical in the last two digits to the reference numerals of corresponding equal or at least functionally equal features and/or components. For avoiding unnecessary repetitions, features and/or components, which have been explained already with reference to a previously described embodiment, are not explained any more in detail later.

Furthermore, it is pointed out that the subsequently described embodiments represent only a limited selection of embodiment variants of the invention. In particular, it is possible to combine the features of individual embodiments with each other in a suitable manner, so that a plurality of different embodiments are to be considered as obviously disclosed for the skilled person with the embodiment variants illustrated explicitly herein.

In addition, it is pointed out that space-related terms, such as for example "in front" and "behind", "at the top" and "at the bottom", "left" and "right", etc. are used to describe the relation of an element to another element or to other elements such as it is illustrated in the figures. Accordingly, the space-related terms may apply for orientations, which differ from the orientations that are represented in the figures. It is however understood by itself that all such space-related terms, for the reason of simplicity of the description, relate to the orientations represented in the drawings and are not necessarily limiting, because the respective illustrated device, component, etc., when it is in use, may assume orientations, which may be different from the orientations illustrated in the drawings.

Figure 1A:
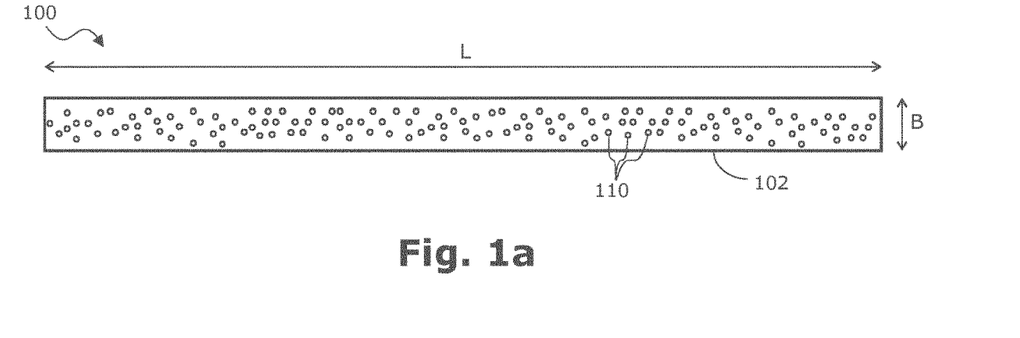
FIG. 1a shows, in a top view, a heating means having a plurality of openings, which are formed irregularly in a ribbon-type structure.

FIG. 1a shows, in a top view, a heating means 100. The heating means 100 may consist substantially of a ribbon-type structure 102, in which a plurality of openings 110 may be formed, for example by punching. According to the embodiment example represented herein, the openings 110 may be spatially arranged irregularly. As has been discussed above, in a welding process, the openings may enable a flowing through of molten-on plastic material through the ribbon-type structure 102. Alternatively or in combination, also a suitable plastic material may be located in the openings already before the very welding process, which plastic material then, during the welding, may connect to the plastic materials of the two objects to be welded together.

In preferred embodiment examples, a length L of the ribbon-type structure 102 may be in the range of 40 mm to 3200 mm, and in particular in the range from 60 mm to 800 mm. A typical ratio between the length L and a width B of the ribbon-type structure 102 may be less than 1:10, in particular less than 1:100.

Figure 1B:
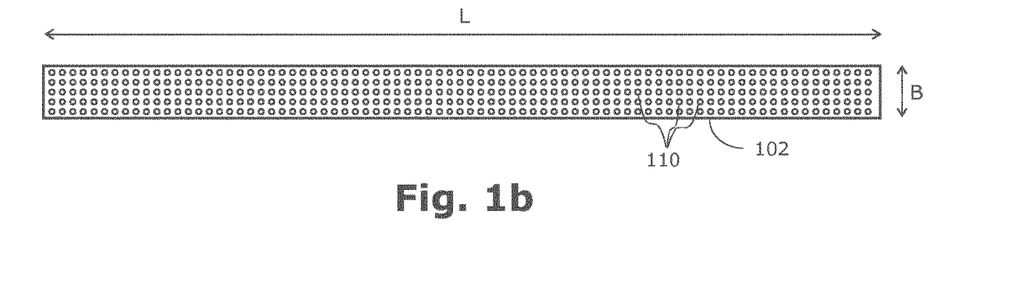
FIG. 1b shows, in a top view, a heating means having a plurality of openings, which are arranged in a regular pattern.

FIG. 1b shows, in a top view, a heating means 200 according to a further embodiment example of the invention. Herein, the openings 110 may be arranged in a regular pattern. In other embodiments, which are not represented, the openings may be offset relative to each other such that a regular pattern may result, too.

Both regularly and also irregularly arranged openings 110 may have an average distance to each other, which may be in the range between 0.1 mm and 5 mm, and in particular in the range between 0.5 mm and 3 mm.

The ribbon-type structure 102 may consist of a perforated metal ribbon (or metal belt). The ferromagnetic material of the ribbon-type structure 102 may for example be steel. In order to achieve an additional, not represented contouring, the perforated metal ribbon may be a metal ribbon that has been stretched by a sufficient tensile force.

In other embodiments, the ribbon-type structure 102 may be a woven or braided roving (or strand, or scrim) of single wires. These may optionally have a functional coating for an improved heat conductivity, a corrosion protection, etc.

Figure 2:
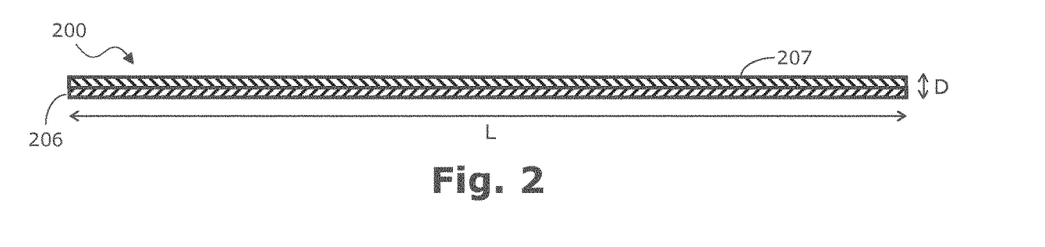
FIG. 2 shows, in a top view, a heating means, which has an electrically isolating matrix material and ferromagnetic particles embedded therein.

FIG. 2 shows, in a side view, a heating means 200, which has two layers of ferromagnetic materials. A first layer 201 may have a ferromagnetic material having a first Curie temperature. The second layer 207 may have a second ferromagnetic material having a second Curie temperature. According to the embodiment example represented herein, the two Curie temperatures may be different. Thus, an average Curie temperature of the heating means 200 may result, which may be adapted to the respective specific welding application by a suitable selection of the two ferromagnetic materials.

In other embodiments, no common average Curie temperature may arise, such that an inductive energy input to the heating means 200 may be, upon a reaching of the lower Curie temperature, reduced, but not prevented completely. As a consequence, for a same inductive excitation, a slower temperature increase may result, wherein an inductive coupling between the excitation coil and the heating means may be switched off upon reaching the higher Curie temperature.

In preferred embodiments, a thickness D of the heating means 200 may be in a range between 0.1 mm and 5 mm, and in particular in a range between 0.5 mm and 3 mm. These dimensions (or sizes) may hold also for a ribbon-type structure, which may consist of only one layer of a ferromagnetic material.

It is pointed out that the heating means 200 may have a surface roughness at its plane (or two-dimensional) sides, i.e. in FIG. 2 at the upper surface and/or at the lower surface. Such a surface roughness may be based on elevations and recesses, which may have an average height difference relative to each other. In preferred embodiments, this average height difference may be greater than 10 µm. A surface roughness may result in improved welding results also for a single-layered ribbon-type structure.

Figure 3:
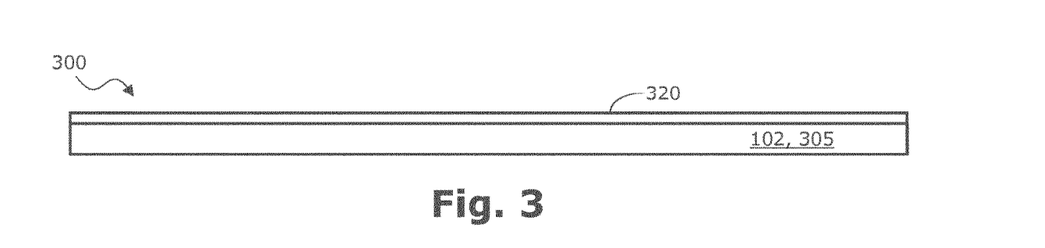
FIG. 3 shows, in a side view, a heating means having a ribbon-type structure, which has a matrix material having embedded ferromagnetic particles and two flexible carrier elements embodied as carrier films.

FIG. 3 shows, in a side view, a heating means 300 having an adhesion changing layer 320, which may be formed on a ribbon-type structure 102, which may have a ferromagnetic material 305. According to the embodiment example represented herein, the adhesion reducing means may be a simple oxide layer.

The adhesion changing layer 320 may contribute to improving the flow behaviour of molten-on plastic material, which may come in contact with the heating means 300 in view of a particularly stable welded connection after the cooling down.

Figure 4:
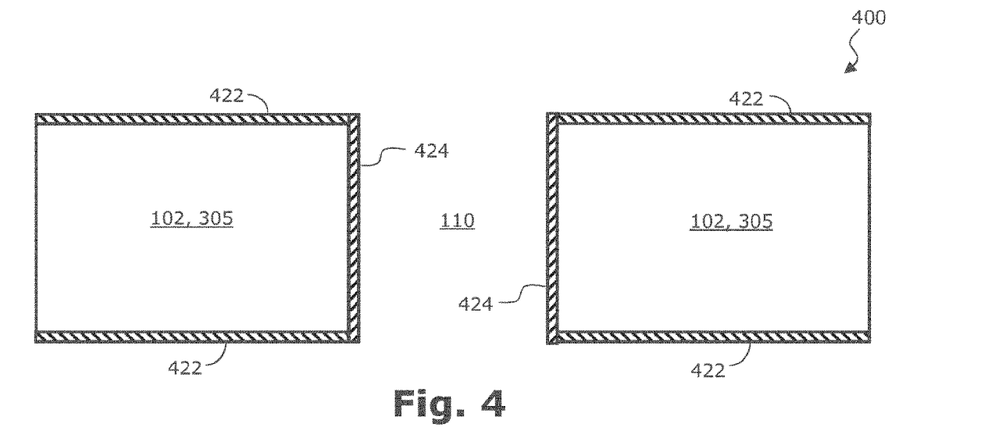
FIG. 4 shows, in a magnified cross-sectional view, a heating means having an opening, wherein respectively one adhesion increasing layer is formed on the two plane surfaces of the heating means and an adhesion reducing layer is formed at the walls of the opening.

FIG. 4 shows, in a magnified cross-sectional view, a heating means 400 having an opening 110 out of a plurality of openings. An adhesion strengthening layer 422 may be formed on the two plane surfaces, i.e. the lower side and the upper side, of the heating means 400, respectively. An adhesion reducing layer 424 may be formed at the sidewalls of the opening 110. Thereby, the flow behaviour of molten-on plastic through the openings 110 may thereby be improved in an advantageous manner, such that a particularly stable plastic connection may be formed through the opening 110. Furthermore, also a mechanically more or less strong connection between the heating means 400 and the respective plastic object may be produced at the two plane surfaces of the ribbon-type structure 102 by an adhesive force strengthening. This may contribute to a further improvement of the overall welded connection.

Figure 5:
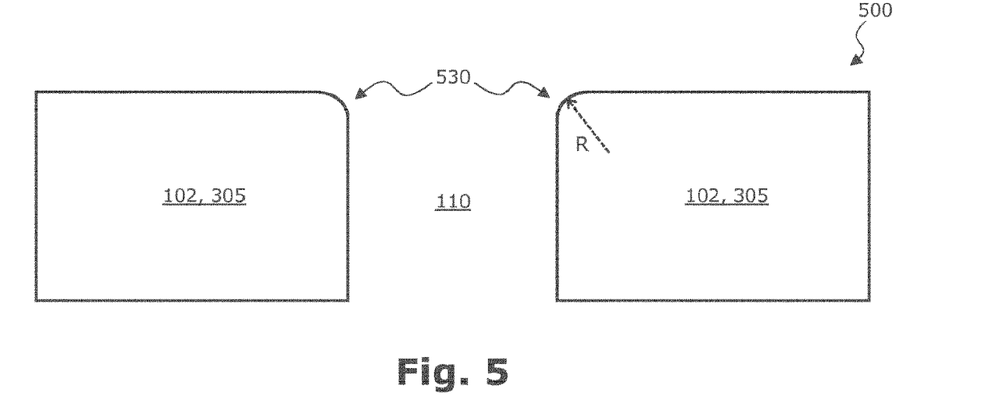
FIG. 5 shows, in a magnified cross-sectional view, an opening formed in a heating means, which opening has a rounding-off at an upper side.

FIG. 5 shows, in a magnified cross-sectional view, a heating means 500, wherein, also in a ribbon-type structure 102 made of a ferromagnetic material 305, a plurality of openings 110 is formed. As can be seen from the exemplary illustrated opening 110, a transition from a plane upper side of the ribbon-type structure to the opening 110 may occur with a rounding-off (or chamfering) 530. This may contribute to that an initially horizontally flowing molten-on plastic material may not have to flow around a corner when intruding into the opening 110. Thereby, the flow behaviour of the molten-on plastic material into the opening 110 may be improved.

In preferred embodiment examples, a radius R of the rounding-off may be in a range from 1 µm to 100 µm. It is however pointed out that instead of a rounding-off, which may be circular in cross-section, also other types of chamfered edges, for example a countersink, may contribute to an improved flow behaviour of molten-on plastic material into the opening 110.

Figure 6:
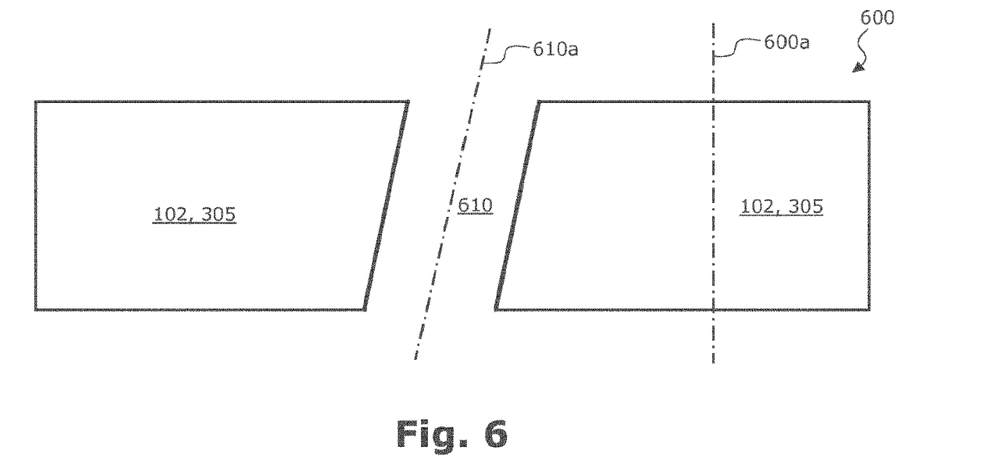
FIG. 6 shows, in a magnified cross-sectional view, a heating means having an inclined opening.

FIG. 6 shows, in a magnified cross-sectional view, a heating means 600, in which an inclined (or slanting) opening 610 may be formed. Herein, the "inclination" of the openings refers to an angle, which may be formed between a longitudinal axis 610a of the opening 610 and a surface normal 600a of the plane surface of the heating means 600. In preferred embodiment examples, this angle may be in a range between 10° and 60°, in particular in a range between 20° and 50°, and further in particular in a range between 30° and 40°.

Figure 7:
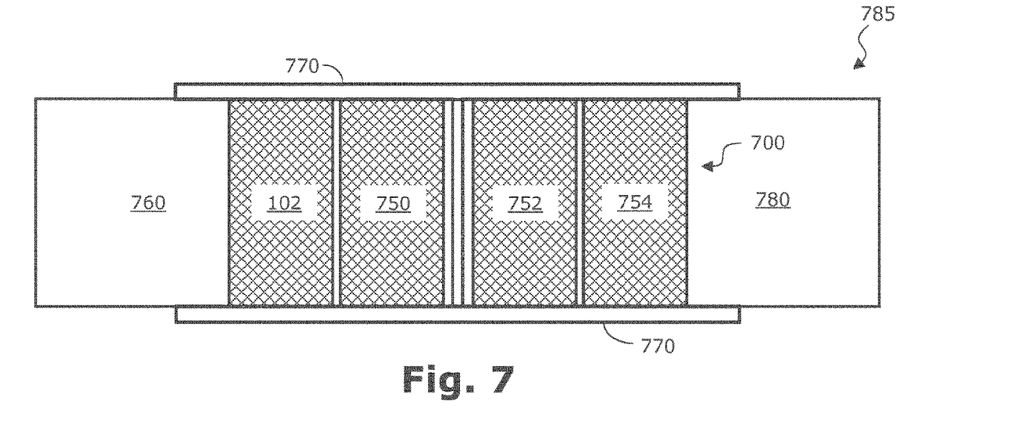
FIG. 7 shows, in a schematic top view, an arrangement having two inner pipes and one outer bushing, which are all welded to each other by a heating means having in total four ribbon-type structures.

FIG. 7 shows, in a schematic top view, an arrangement 785 having two inner plastic objects 760 and 780 each formed as a pipe, and an outer plastic object 770 formed as a bushing, which may have all been welded to each other by a heating means 700. According to the embodiment example illustrated here, the heating means 700 may have in total four ribbon-type structures, a first ribbon-type structure 102 as well as three further ribbon-type structures 750, 752 and 754, which may have been wound around the plastic pipe 760 and/or around the further plastic pipe 780 parallel to each other, respectively, with a small distance. As can be seen from FIG. 7, the heating means 700 having four ribbon-type structures may be located between the bushing 700 and the plastic pipe 760 and/or between the bushing 770 and the further plastic pipe 780.

In this relation, it is pointed out that the FIG. 7 shows the arrangement 785 basically in a top view. For reasons of a better clarity, only the bushing 770 is illustrated in a cross-sectional view.

Figure 8:
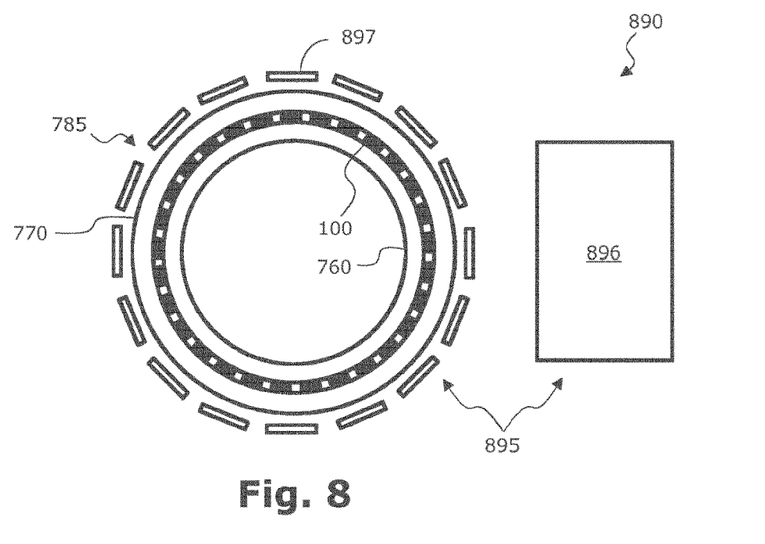
FIG. 8 shows a system having (a) an induction generator, (b) an arrangement to be welded together consisting of an inner plastic pipe and an outer bushing, and (b) a materially closed but electrically interrupted heating means between the inner pipe and the outer bushing.

FIG. 8 shows a system 890 having (a) the arrangement 785, which is represented in a cross-sectional view, and (b) an induction generator 895, which may be provided to inductively heat the heating means 100, and thus to weld together the bushing 770 with the plastic pipe 760. The induction generator 895 may have an excitation device 896 as well as a primary coil arrangement having a plurality of primary coils 897, which primary coil arrangement may be arranged around the bushing 770, and which may be fed with current being an electrically alternating current by the excitation device 896.

As can be seen from FIG. 8, according to the embodiment example represented herein, the heating means 100 may be wound completely around the plastic pipe 760, such that a non-represented overlap may result between the two ends of the heating means 760. The heating means may thus be considered as a (closed) secondary coil, which may be electromagnetically coupled to the plurality of the primary coils 897, and thus also inductively coupled.

It is pointed out that the arrangement of the primary coil may alternatively also have only one single primary coil, which may run around the bushing 770. Such a single primary coil that may be laid around the bushing 770 may be realized for example with suitable electrical plug connections, which may be opened after a hopefully successful welding process, such that the single primary coil can be removed from the arrangement 785. The inductive coupling between the induction generator 895 and/or the primary coil arrangement thereof and the heating means 100, which may represent a closed coil winding, may correspond to the magnetic and/or inductive coupling in a conventional transformer, wherein the primary coil arrangement may correspond to the primary coil of the transformer, and the heating means 100 may correspond to the secondary coil of the transformer.

In preferred embodiment examples, the bushing 770 may consist of a material, which would perform a shrinkage along its circumference without a counterpressure by the plastic pipe 760 in a virtual welding process, which shrinkage may amount to at least 10%, preferably at least 20%, and further preferably at least 30%. Thereby, in practice, thus with a counterpressure by the plastic pipe 760, a mechanical tension may be generated, which may result in an improvement of the welding result.

Figure 9:
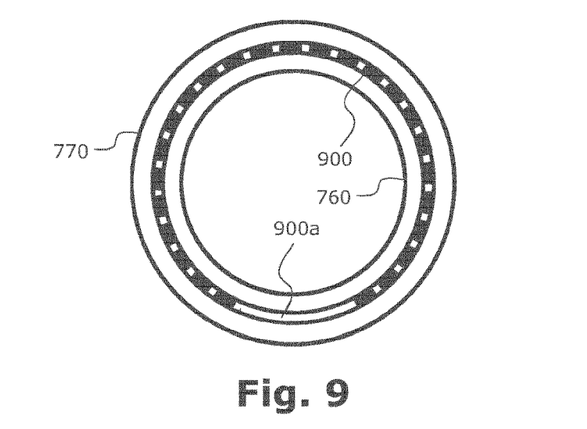
FIG. 9 shows a system having (a) an induction generator having an open coil device, (b) an arrangement to be welded together consisting of one inner plastic pipe and one outer bushing, and (b) a both materially and electrically interrupted heating means between the inner pipe and the outer bushing.

FIG. 9 shows, in a cross-sectional view, a heating means 900, which may surround the plastic pipe 760 only partially, and thus may form an open structure. In FIG. 9, the open region is indicated with the reference numeral 900a. As has been described already above, for the open loop that may be given by the heating means 900, an inductive energy transfer may be ensured only by the generation of eddy currents, which may require a microscopic conductivity of the ribbon-type structure of the heating means 900.

It should be noted that the expression "having" (or "comprising") does not exclude other elements, and that the article "a" (or "an") does not exclude a plurality. Also, elements which are described in connection with different embodiment examples, may be combined.

REFERENCE NUMERALS

| | |
|---|---|
| 100 | heating means |
| 102 | ribbon-type structure |
| 110 | openings |
| L | length |
| B | width |
| 200 | heating means |
| 201 | first layer/first ferromagnetic material having first Curie temperature |
| 207 | second layer/first ferromagnetic material having second Curie temperature |
| 300 | heating means |
| 305 | ferromagnetic material |
| 320 | adhesive force changing layer |
| D | thickness |
| 400 | heating means |
| 422 | adhesive force strengthening layer |
| 424 | adhesive force reducing layer |
| 500 | heating means |
| 530 | rounding-off |
| R | rounding-off radius |
| 600 | heating means |
| 600a | surface normal |
| 610 | inclined opening |
| 610a | longitudinal axis |
| 700 | heating means |
| 750 | further ribbon-type structure |
| 752 | further ribbon-type structure |
| 754 | further ribbon-type structure |
| 760 | first inner object/plastic pipe |
| 770 | second outer object/bushing |
| 780 | third inner object/further plastic pipe |
| 785 | arrangement |
| 890 | system |
| 895 | generator/induction generator |
| 896 | excitation device |
| 897 | primary coil |
| 900 | heating means |
| 900a | open region |

The invention claimed is:

1. A heating means for thermally connecting two objects each having a plastic material, wherein, in the connecting, a first inner object is surrounded at least partially by a second outer object and the heating means is located between the first inner object, and the second outer object, the heating means comprising:
a ribbon-type structure, in which a plurality of openings is formed, and
an adhesion changing layer, which is attached to, or formed at, at least one surface of the ribbon-type structure, wherein the adhesion changing layer effects a flow behavior of molten-on plastic material,
wherein the openings are dimensioned such that molten-on plastic material of the first inner object and/or of the second outer object can intrude and can connect the molten-on plastic material of the respective other object, and/or
wherein the openings are filled with a plastic material, which can connect to the molten-on plastic material of the first inner object and/or of the second outer object;
wherein the ribbon-type structure has a ferromagnetic material, which is inductively heatable, and has a Curie temperature that is less than 460° C.

2. The heating means according to claim 1, wherein the ferromagnetic material has a Curie temperature that is less than 400° C.

3. The heating means according to claim 1, wherein the ribbon-type structure has plural ferromagnetic materials, which have different Curie temperatures.

4. The heating means according to claim 1, wherein the ribbon-type structure has a structure in layers of different materials, which have a different hardness, a different elasticity and/or a different ductility.

5. The heating means according to claim 1, wherein the ribbon-type structure is configured to form a closed ribbon-type structure, which is continuously electrically conductive.

6. The heating means according to claim 1,
wherein the adhesion changing layer has an adhesion force strengthening layer at the surface of the ribbon-type structure and/or an adhesion force reducing layer at the sidewalls of the openings, and/or
wherein the adhesion changing layer is an oxide layer and/or has carbonates.

7. The heating means according to claim 1, wherein the openings have an average distance s from each other, which, in relation to a thickness d of the ribbon-type structure, satisfies at least one of the following equations:

$$0.5 < s/d < 2; 0.7 < s/d < 1.5; 0.8 < s/d < 1.3; 0.9 < s/d < 1.1.$$

8. The heating means according to claim 1, wherein a transition between a plane surface of the ribbon-type structure and an opening is rounded-off.

9. The heating means according to claim 1, wherein at least some of the openings each have a longitudinal axis, which form an angle that is different from zero with a surface normal of the surface of the ribbon-type structure.

10. The heating means according to claim 1, further comprising:
at least one further ribbon-type structure, which is arranged beside the ribbon-type structure, wherein the further ribbon-type structure is oriented at least approximately parallel to the ribbon-type structure.

11. The heating means according to claim 1, wherein the ribbon-type structure has a surface having elevations and recesses, wherein an average height difference between the elevations and the recesses is in the range between 0.01 mm and 2 mm.

12. An arrangement, comprising:
a first inner object, which has a first plastic material having a first melting temperature;
a second outer object, which surrounds the first inner object at least partially, and which has a second plastic material having a second melting temperature;
a heating means, which is located between the first inner object and the second outer object, wherein the heating means has a ribbon-type structure and an adhesion changing layer, which is attached to, or formed at, at least one surface of the ribbon-type structure, wherein the adhesion changing layer effects a flow behavior of molten-on plastic material,
wherein the ribbon-type structure has a ferromagnetic material, which is inductively heatable, and has a predetermined Curie temperature, which is higher than the first melting temperature and/or the second melting temperature,
a plurality of openings is formed in the ribbon-type structure, in which openings a solidified plastic material is located, which connects the first inner object to the second outer object, and
a first temperature difference between the predetermined Curie temperature and the first melting temperature and/or a second temperature difference between the predetermined Curie temperature and the second melting temperature is in the range between 5 K and 100 K.

13. The arrangement according to claim 12, wherein the first temperature difference and/or the second temperature difference is in the range between 10 K and 80 K.

14. The arrangement according to claim 12, wherein the two plastic materials are the same.

15. The arrangement according to claim 12, further comprising:
a third inner object, which has a third plastic material having a third melting temperature, wherein the second outer object surrounds at least partially also the third inner object, and
wherein the heating means is located also between the third inner object and the second outer object;
wherein the first inner object is a plastic pipe,
the third inner object is a further plastic pipe, and
the second outer object is a plastic bushing, which surrounds two mutually facing ends, an end of the plastic pipe and a further end of the further plastic pipe.

16. A system, comprising:
a first inner object which has a first plastic material with a first melting temperature;
a second outer object, which surrounds the first inner object at least partially, and which has a second plastic material with a second melting temperature;
a heating means located between the first inner object and the second outer object, wherein the heating means has a ribbon-type structure and an adhesion changing layer, which is attached to, or formed at, at least one surface of the ribbon-type structure, wherein the adhesion changing layer effects a flow behavior of molten-on plastic material,
wherein the ribbon-type structure has a ferromagnetic material, which is inductively heatable, and has a predetermined Curie temperature, which is higher than the first melting temperature and/or the second melting temperature,
a plurality of openings formed in the ribbon-type structure, in which openings a solidified plastic material is located, which connects the first inner object to the second outer object, and
a first temperature difference between the predetermined Curie temperature and the first melting temperature and/or a second temperature difference between the predetermined Curie temperature and the second melting temperature is in the range between 5 K and 100 K; and a generator for generating an electromagnetic field, which inductively couples a primary coil of the generator to the heating means.

17. A method for thermally connecting two objects each having a plastic material, the method comprising:
laying a heating means alongside to a first inner object or to a second outer object, wherein the heating means has a ribbon-type structure having a plurality of openings and a ferromagnetic material and an adhesion changing layer, which is attached to, or formed at, at least one surface of the ribbon-type structure, wherein the adhesion changing layer effects a flow behavior of molten-on plastic material;
arranging the second outer object relative to the first inner object, such that the first inner object is surrounded at least partially by the second outer object and the heating means is located between the first inner object and the second outer object;
inductively heating the heating means such that plastic material of the first inner object and/or plastic material of the second outer object melts on;
intruding molten-on plastic material of the first inner object and/or of molten-on plastic material of the second outer object into the openings, such that the two plastic materials come in contact with each other, and/or melting-on of plastic material, which is already located in the openings;
reducing a power, which is inductively transmitted to the heating means as a consequence of an approaching of the temperature of the ferromagnetic material to a Curie temperature of the ferromagnetic material; and
cooling down the molten-on plastic material of the first inner object and/or of the molten-on plastic material of the second outer object and/or of the plastic material located in the openings, such that the two objects are mechanically connected to each other.

18. The method according to claim 17, wherein the heating means is laid alongside to the first inner object or to the second outer object, such that the two ends of the ribbon-type structure overlap.

19. The method according to claim 17, wherein the heating means is laid alongside to the first inner object or to the second outer object, such that the two ends of the ribbon-type structure are separated from each other.

* * * * *